Nov. 5, 1968   F. G. KERNER   3,409,326
SAFETY SEAT FOR VEHICLES
Filed Oct. 10, 1966   3 Sheets-Sheet 3

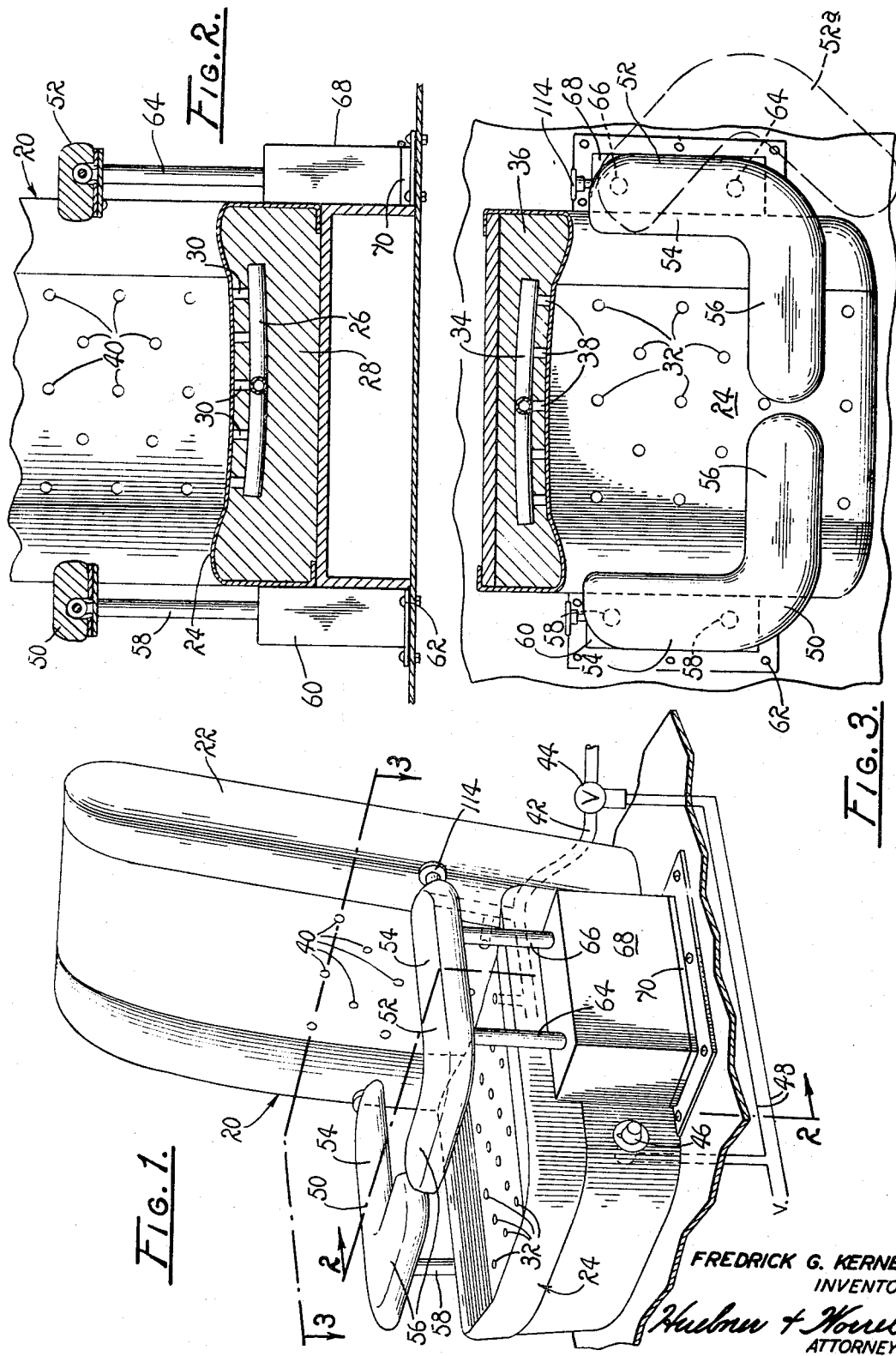

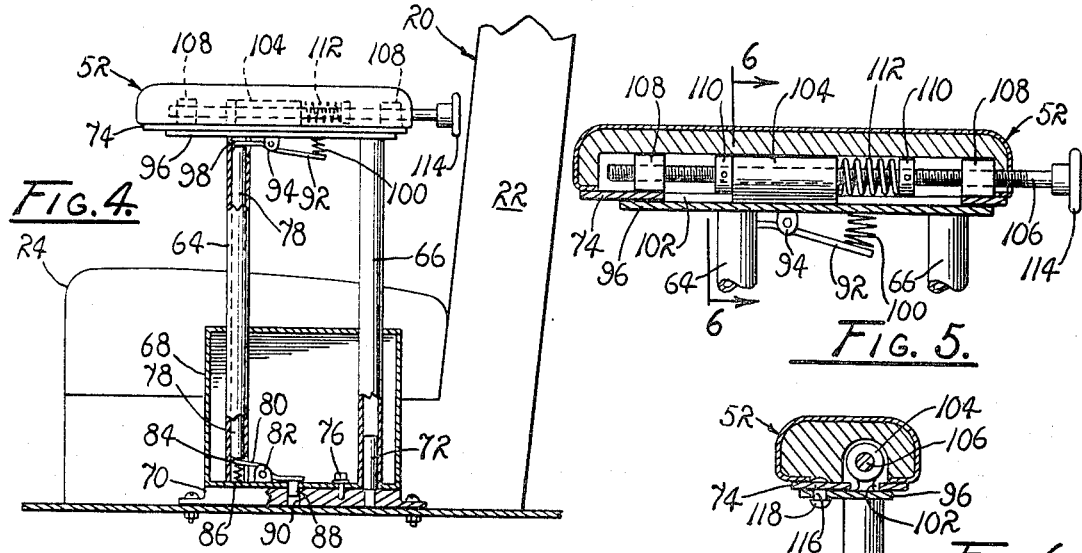
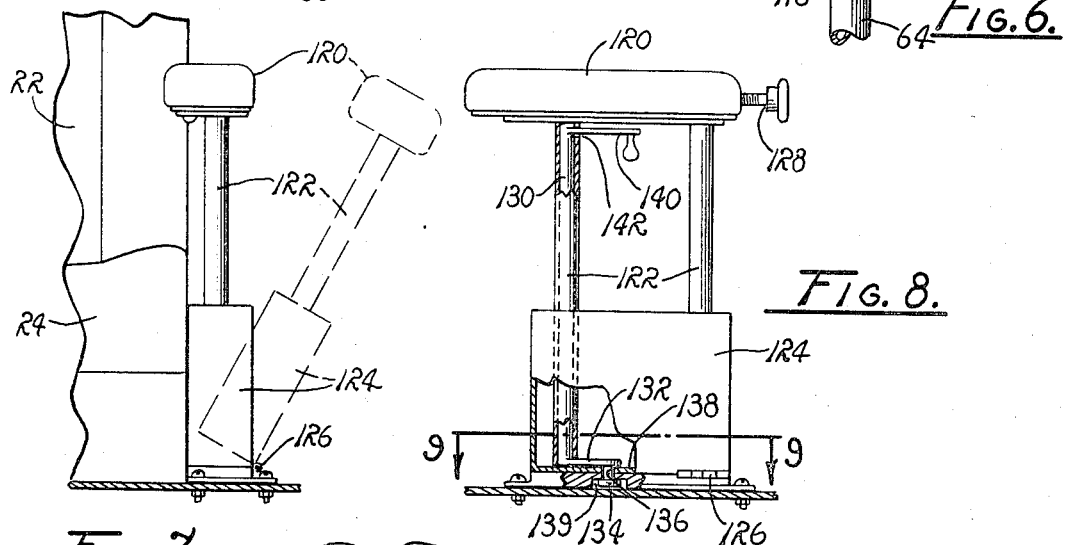
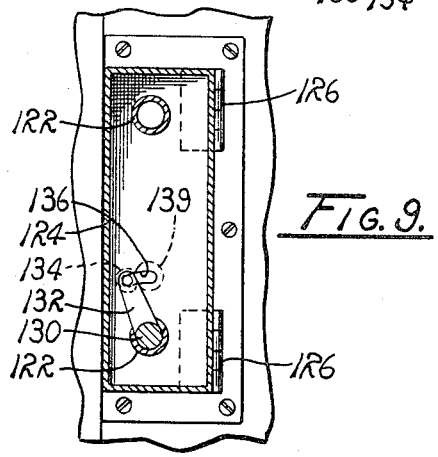
FREDRICK G. KERNER
INVENTOR

FREDRICK G. KERNER
INVENTOR

Huebner & Worrel
ATTORNEYS

United States Patent Office 3,409,326
Patented Nov. 5, 1968

3,409,326
SAFETY SEAT FOR VEHICLES
Fredrick G. Kerner, 4638 E. Grand Ave.,
Fresno, Calif. 93702
Filed Oct. 10, 1966, Ser. No. 585,694
7 Claims. (Cl. 297—384)

ABSTRACT OF THE DISCLOSURE

The invention consists of a seat with armrests, the seat having seat and back portions formed with openings connected to a source of vacuum for providing a suction on the body portions of the occupant of the seat and inducing circulation of air around the occupant. The armrests have body restraining portions which are adjustably resiliently mounted for easy access to the seat and to provide a shock absorbing action when a force or strain is placed thereon to decrease chances of injury to the occupant in the event of a sudden stop or accident.

---

The present invention relates generally to safety devices for use in vehicles, including for example automotive vehicles and aircraft, although applicable in other fields.

More specifically, the present invention relates to a safety seat having suction means and improved armrests with body restraining means for protecting an occupant in a vehicle from injury if an accident occurs, the armrests being adjustable, and having a shock absorbing action.

Recently there have been increasing attempts to decrease injuries to occupants of vehicles, and principally in automotive vehicles when accidents occur.

The present invention has as its primary object new and improved means to further implement the effort to decrease accident injuries, and provides mechanism adapted to replace automobile seat belts by other more effective and comfortable means, to increase a desire to use the safety means and in one aspect of the invention to incorporate in the structure features substantially requiring use of the safety means in order to operate a vehicle.

It is a further object of the invention to incorporate safety structures in seats of vehicles having enhanced restraining characteristics over those heretofore provided by seat belts, and which can be easily and efficiently incorporated in seat structures of vehicles.

Another object of the present invention is to provide safety mechanisms as applied to vehicle seats utilizing a new principle of restraining the body of an occupant in the seat in the event of an accident.

An additional object of the present invention resides in the use of a new principle of body restraint utilizing vacuum as applied to surfaces of a seat and shock absorbing armrests operable upon engagement of a body thereagainst to create a resilient restraining force.

A further object is to incorporate in seat safety enhancing means of the nature described additional body restraining means in the nature of adjustable armrests, movable from an operative body engaging position to a non-operative position to permit a person to assume a position in the seat, and thereafter the armrest can be locked in a body restraining position.

A still further object of the invention resides in incorporating in a safety structure as applied to vehicle seats, means having a shock absorbing action when a force or strain is placed thereon if an accident should occur which would tend to forwardly dislodge an occupant of a seat to thereby decrease chances of injury.

Other and further objects and advantages of the present invention will be more readily apparent from the following detailed description of embodiments thereof when taken together with the accompanying drawings in which:

FIG. 1 is a perspective view of a vehicle seat incorporating the safety features of the present invention;

FIG. 2 is a fragmentary sectional view taken on line 2—2 of FIG. 1;

FIG. 3 is a sectional view taken on line 3—3 of FIG. 1;

FIG. 4 is a right side elevational view of the seat construction of FIG. 3, parts thereof being broken away for clarity, and disclosing adjustment means for adapting the safety mechanism to occupants of different sizes;

FIG. 5 is an enlarged cross-sectional view of the armrest of FIG. 4 showing in greater detail adjustment means for the armrest;

FIG. 6 is a sectional view taken on line 6—6 of FIG. 5;

FIG. 7 is a fragmentary front elevational view of a modified form of an armrest embodying the principles of the invention;

FIG. 8 is a side elevational view of the armrest of FIG. 7, parts being broken away for clarity, and including adjustment mechanisms for the armrests;

FIG. 9 is a sectional view taken on line 9—9 of FIG. 8;

Figure 10:
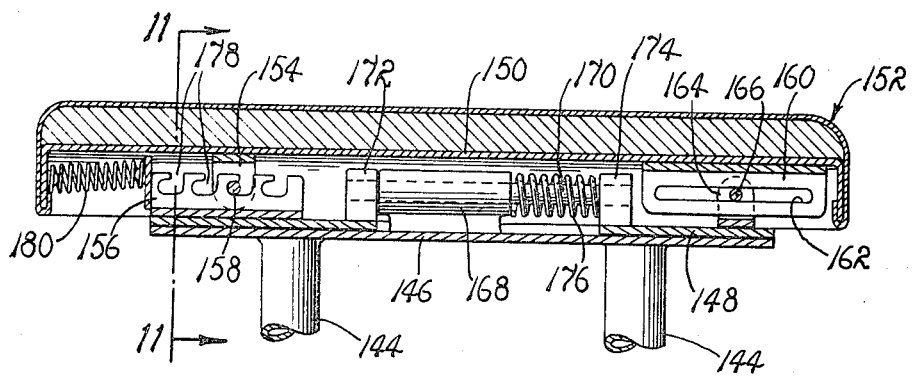
FIG. 10 is a fragmentary cross-sectional view of a modified form of armrest with different adjustment mechanisms.

Referring now in more detail to the drawings, there is shown a seat generally designated 20, which can be of a type adapted for use in vehicles such as aircraft and automotive vehicles. This seat has a backrest 22 and a seat portion 24, in a usual known manner. The new principle of restraining forward impelled motion of a seat occupant in the event of a collision or accident includes shock absorbing armrests and a vacuum system operatively associated with the back and seat portions. A flexible manifold 26 in the nature of an extended bag or a plurality of tubes or the like are incorporated in the padding 28 of the seat, and through a plurality of conduits 30 or the like communicate with a plurality of openings 32 in the seat surface. In like manner a similar manifold 34 is incorporated in the back portion padding 36 with a plurality of conduits 38 communicating with a plurality of openings 40 in the front surface of the back portion. The manifolds are operatively connected by conduit or tube 42 through valve 44 to a source of vacuum, not shown. Operation of the vacuum means is selective by means of a switch indicated at 46 connected by appropriate electrical leads 48 to the valve and to the source of vacuum.

In this aspect of the invention, once an occupant has assumed a seated position in the safety seat, as shown for example in FIG. 1, the switch 46 will be actuated to an on position to open valve 34 and initiate operation of the vacuum means. This results in creating a suction in manifolds 26 and 34 which effectively creates a suction on the surface of the seat portion and back portion. The suction thus created has a restraining action on the body of an occupant which works against the force which otherwise might tend to impel a seat occupant forwardly away from the seat in the event of a collision or sudden stoppage of the vehicle. Also, the suction induces circulation or flow of air, which may be cooled or heated for the comfort of the occupant of the seat.

Manifestly, the exact construction and arrangement of the seat and suction creating means can be varied, and only a single embodiment of mechanism for practicing the invention is shown herein. Such obvious modifications are, of course, within the considered scope of the invention and application.

To further increase resistance against forwardly impelling forces in the event of an accident, and as an additionally improved result over that normally attained by the use of seat belts, new and novel armrest constructions and configurations are contemplated and taught herein. Referring specifically to a first form of armrest construction as contemplated by the invention, attention is directed to FIGS. 1–3, inclusive. Armrests 50 and 52 are arranged at opposite sides of the seat. Each armrest includes a longitudinal portion 54 and a lateral inwardly extending portion 56, formed integrally with the longitudinal portions. These armrests are padded to provide not only comfort, but added safety to a seat occupant. In the embodiment shown, the armrest 50 will be fixed by means of uprights 58 to a pedestal 60 secured to the vehicle floor as generally shown at 62.

In order ot permit an occupant to assume a seated position in the seat, provision must be made for moving at least one of the novel armrests to a non-obstructing position with respect to the seat and the other armrest, because of the configuration of the armrests which are so shaped as to substantially encompass and restrain a seat occupant in a usual position in the seat. Mechanisms to permit movement of at least one armrest to a non-obstructing inoperative position can take different forms.

In the embodiment of FIGS. 1–3, inclusive the armrest 52 is supported by means of uprights 64 and 66 in the nature of tubes which extend into pedestal 68. The pedestal 68 is pivotally supported on a base 70 secured to the floor of the vehicle by appropriate means such as bolts. Referring to FIG. 4, a stud 72 rotatably mounted in the base 70 serves as a pivot and extends into the tube constituting upright 66, which at its upper end is fixed to a plate 74 constituting a lower support for armrest 52. A pin and arcuate slot arrangement, generally designated 76, interconnect base 70 and pedestal 68. A rod or shaft 78 extends through upright 64 in slidable relation therein. A spring-biased locking member 80 is pivotally mounted at 82 and has a nose portion 84 engaging with the lower end of rod 78, and by means of spring 86 is biased to an upward rod supporting position. A projection 88 or the like extends through the bottom of pedestal 68 and engages in an opening 90 formed in base 70. A lever 92 is pivotally mounted at 94 to plate 96 and has a nose portion 98 engageable with the top end of shaft 78. A rearward end of lever 92 is downwardly biased by spring 100, and the lever serves as a handle for depressing shaft 78 selectively to press against nose portion 84 of member 80 to disengage projection 88 from opening 90, to thereby permit the armrest to be pivoted on stud 72 to the position indicated at 52a in FIG. 3, so that a person can occupy the seat without interference from the inward extending portions of the armrest.

Provision is made for fore and aft adjustment of the armrests 50 and 52 to accommodate persons of different sizes, and additionally means are provided for resilient engagement thereof upon a forward movement of a seat occupant. This construction is shown in greater detail in FIGS. 4, 5 and 6. Plate 74, which is attached to the lower surface of armrest 52, is provided with a slot 102 centrally disposed. A tubular bracket 104 is secured to plate 96 and slidably encircles a threaded shaft 106 operatively secured in nuts 108, which are fixedly secured to plate 74. Collars 110 are secured to shaft 106 and serve as stops for forward and aft movement of the armrest. A spring 112 is interposed between the rearward collar 110 and bracket 104. A handle 114 is provided on the rearward end of shaft 106, and upon turning thereof serves to adjust the armrest 52 on and with respect to lower plate 96 to adjust the forward and aft positions of the armrest. Upon a forward force being applied to the armrest, the armrest will slide forward by sliding engagement of plate 74 with respect to plate 96 and will be resiliently retarded in forward movement by spring 112 and the forward and aft positions are fixed by means of engagement of one or the other of collars 110. This resilient mounting serves to cushion a forward thrust of an occupant of a seat against the armrest. A slot 116 is provided in plate 96 through which a rivet 118 extends in slidable engagement therein and is secured to upper plate 74 to provide for a relative sliding movement between plates 74 and 96. Operation of this form of the invention will be readily understandable from the drawings and the foregoing description.

Another construction permitting movement of armrest 52 to a position permitting a person to occupy a seat is shown in FIGS. 7–9 inclusive, and which also includes an adjustable feature for forward and aft positioning of the armrest. In this embodiment of the invention armrest 120 is supported on uprights 122 which extend into pedestal 124. A hinge 126 pivotally mounts the outer edge of pedestal 124 to permit movement of the armrest and pedestal from the position shown in full lines in FIG. 7 to the position shown in dotted lines in this figure, to thereby move the armrest 120 into a non-interferring position to permit a person to be seated, and thereafter the armrest can be returned to its operative body engaging position. A threaded shaft and handle assembly 128 is provided in a manner similar to the adjustable resilient construction shown in FIGS. 4–6 to permit forward and aft adjustment of the armrest. A rod 130 is rotatably mounted in forward upright 122, in pivotal engagement with the underside of armrest 120, and having at its lower end an arm 132 carrying a stud 134 with an enlarged end, the stud removably extending through an opening 136 formed in lower pedestal plate 138 into a partially restricted mouth slot 139.

A handle generally designated 140 is secured in proximity to the upper end of rod 130 extending through a slot 142 in upright 122. The latter described mechanism constitutes a locking means for the armrest and pedestal when in the upright body engaging position, and upon movement of handle 140 will rotate rod 130 to permit disengagement of stud 134 through opening 136 and the slot to permit outward movement of the armrest and pedestal to the position shown in dotted lines in FIG. 7 in an obvious manner.

Figure 11:
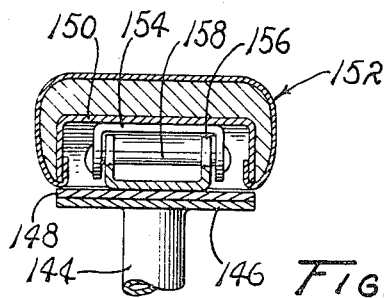
FIG. 11 is a sectional view taken on line 11—11 of FIG. 10.

Another embodiment of means for adjusting the fore and aft positions of an armrest is shown in FIGS. 10 and 11. Supporting uprights 144 are connected to plate 146 and are adapted for connection to one of the pedestal constructions shown and described herein. An upper plate 148 is slidably supported on plate 146 and serves as the mount for the armrest. A channel-shaped member 150 is built into and forms a portion of the construction of armrest 152. A front upper bracket 154 is secured to the underside of channel 150 and is connected to lower bracket 156 secured to plate 148 by means of a pin 158. A rear bracket 160 is secured to the under surface of channel member 150 and has an elongated slot 162 therein. A rear lower bracket 164 is secured to plate 148, and interconnected with bracket 160 by means of pin 166 engaged in slot 162 in slidable engagement therewith. A tubular bracket 168 is fixed to plate 146 and slidably surrounds a rod 170 supported in fore and aft brackets 172 and 174 secured to plate 148. A spring 176 is interposed between bracket 168 and bracket 174 to provide a resilient impedance to forward movement of the armrest, upon a forward thrust of a body of an occupant of a seat to which this armrest is attached in a manner previously described with reference to the embodiment of FIGS. 4–6 inclusive. Lower bracket 156 has a plurality of bayonet slots 178 provided therein in which pin 158 is selectively engageable. When it is desired to adjust the fore and aft positions of the armrest, a slight rearward and upward movement thereof will displace pin 158 from a bayonet slot, which movement is permitted by means of the pin 166 being slidable in slot 162, and permit pivoting upwardly of the front end of the armrest 152 which can thereafter be moved either forward or aft for subsequent engagement in another selected one of bayonet slots 178. Preferably an additional spring 180 is interposed between bracket 164 and bracket 160 in any desired manner to provide additional resilient restraint against forward movement of the armrest 152, and at the same time insure proper locking engagement of pin 158 in one of bayonet slots 178.

Figure 12:
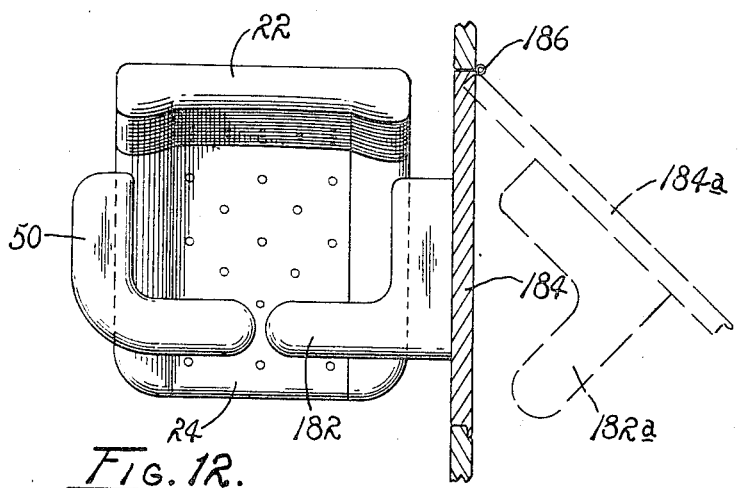
FIG. 12 is a plan view of an additional modified form of an armrest construction according to the invention.

A still further embodiment of an armrest construction is shown in FIG. 12. Here a movable armrest 182 is secured to a vehicle door 184 which is hingedly mounted at 186. When a user of a vehicle opens door 184 it will move from the position shown in full lines in FIG. 12 to a position 184a shown in dotted lines in this figure, to thereby move the armrest 182 therewith to a non-interferring position so that an occupant can seat himself and thereafter, upon closing of the door, the armrest 182 is brought into a desired body engaging and restraining position.

Although the invention has been herein shown and described in what are conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A safety seat for vehicles comprising, armrests on each side of said seat including longitudinally extending and laterally inwardly extending front portions, forming when in operative position, body restraining means contactable with the side and front of a seat occupant.

2. A safety seat as claimed in claim 1, means pivotally mounting one said armrest for movement from a body restraining position to a non-restraining position to permit access to said seat.

3. A safety seat as claimed in claim 2, means resiliently mounting said armrests to permit limited restrained forward movement thereof upon receiving a forward impelling force from the body of a seat occupant.

4. A safety seat as claimed in claim 3, including means mounting said armrests for incremental forward and aft adjustment thereof to accommodate said armrests to seat occupants of different sizes.

5. A safety seat as claimed in claim 2, front and rear supporting uprights secured to the underside of said one armrest, the rear upright being pivotally mounted, and means for selectively locking and unlocking said front upright in restraining position of said armrest, and permitting selective pivotal movement of the front of said armrest around said rear upright to place said armrest in an inoperative non-restraining position to permit access into the seat by an occupant.

6. A safety seat for vehicles as claimed in claim 2, front and rear supporting uprights secured to the underside of said one armrest, a pedestal operatively mounting said uprights, hinge means at the outer lower edge of said pedestal, and means for selectively locking said pedestal, said uprights, and said one armrest in body restraining position, and operable to selectively release said pedestal for outwardly pivoting about said hinge to move said one armrest to an inoperative non-restraining position to permit access into the seat by an occupant.

7. A safety seat for vehicles as claimed in claim 1, one said armrest being secured to a vehicle door, and movable therewith from an active body restraining position to an inactive non-restraining position upon opening of the vehicle door to permit access into the seat by an occupant.

References Cited

UNITED STATES PATENTS

| | | | |
|---|---|---|---|
| 2,782,574 | 2/1957 | Copold | 248—363 X |
| 2,844,193 | 7/1958 | Lauterbach | 297—390 X |
| 3,042,356 | 7/1962 | Audino | 248—363 |
| 3,126,192 | 3/1964 | Stein | 248—362 |
| 3,165,357 | 1/1965 | Rudemann | 297—384 |
| 3,173,722 | 3/1965 | Carbonetti | 297—390 X |

JAMES T. McCALL, *Primary Examiner.*